(12) United States Patent
Servant et al.

(10) Patent No.: US 10,664,240 B2
(45) Date of Patent: May 26, 2020

(54) CRYPTOGRAPHIC PROCESSING METHOD COMPRISING MULTIPLICATION OF A POINT OF AN ELLIPTIC CURVE BY A SCALAR

(71) Applicant: Idemia Identity & Security France, Issy-les-Moulineaux (FR)

(72) Inventors: Victor Servant, Issy-les-Moulineaux (FR); Guillaume Dabosville, Issy-les-Moulineaux (FR)

(73) Assignee: IDEMIA IDENTIFY & SECURITY FRANCE, Issy les Moulineaux (FR)

( * ) Notice: Subject to any disclaimer, the term of this patent is extended or adjusted under 35 U.S.C. 154(b) by 358 days.

(21) Appl. No.: 15/727,058

(22) Filed: Oct. 6, 2017

(65) Prior Publication Data

US 2018/0101362 A1   Apr. 12, 2018

(30) Foreign Application Priority Data

Oct. 7, 2016   (FR) ...................... 16 59677

(51) Int. Cl.
*G06F 21/00* (2013.01)
*G06F 7/72* (2006.01)
(Continued)

(52) U.S. Cl.
CPC .......... *G06F 7/725* (2013.01); *G06F 9/30098* (2013.01); *G06K 19/07* (2013.01);
(Continued)

(58) Field of Classification Search
None
See application file for complete search history.

(56) References Cited

U.S. PATENT DOCUMENTS 7,200,225 B1 * 4/2007 Schroeppel ........... H04L 9/3066
380/28
9,772,821 B2 * 9/2017 Feix ........................ G06F 7/725
(Continued)

FOREIGN PATENT DOCUMENTS

| FR | 3033965 A1 | 9/2016 |
| WO | 2014/111647 A1 | 7/2014 |
| WO | 20151/21324 A1 | 8/2015 |

OTHER PUBLICATIONS

Computer Desktop Encyclopedia definition of "processor": http://lookup.computerlanguage.com/host_app/search?cid=C999999&term=processor&lookup.x=0&lookup.y=0 (Year: 2014).*
(Continued)

*Primary Examiner* — Jeremiah L Avery
(74) *Attorney, Agent, or Firm* — Womble Bond Dickinson (US) LLP (57) ABSTRACT

The invention relates to a cryptographic processing method comprising multiplication of a point P of an elliptic curve on a Galois field by a scalar k, the multiplication comprising steps of: storing, in a first register, a zero point of the Galois field, executing a loop comprising at least one iteration comprising steps of: selecting a window of w bits in the non-signed binary representation of the scalar k, w being a predetermined integer independent of the scalar k and strictly greater than 1, calculating multiple points of P being each associated with a bit of the window and of the form $\pm 2^i P$, adding or not in the first register of multiple points stored, depending of the value of the bit of the window with which the multiple points are associated, wherein the loop ends once each bit of the non-signed binary representation of the scalar k has been selected, returning a value stored in the first register. If all the bits of the window selected during an iteration of the loop are zero, the iteration comprises at least one dummy execution of the addition function, and/or if all
(Continued)

the bits of the window during an iteration of the loop are non-zero, the multiple points to be added in the first register during the step are determined from a non-adjacent form associated with the window.

11 Claims, 2 Drawing Sheets

(51) Int. Cl.
  *H04L 9/00* (2006.01)
  *G06F 9/30* (2018.01)
  *G06K 19/07* (2006.01)
  *H04L 9/30* (2006.01)
(52) U.S. Cl.
  CPC ............ *H04L 9/003* (2013.01); *H04L 9/3066* (2013.01); *G06F 2207/7261* (2013.01); *G06F 2207/7285* (2013.01)

(56) References Cited

U.S. PATENT DOCUMENTS

| | | | | |
|---|---|---|---|---|
| 2002/0062330 | A1* | 5/2002 | Paar | G06F 7/724 708/492 |
| 2002/0178371 | A1* | 11/2002 | Kaminaga | G06F 7/723 713/189 |
| 2009/0238360 | A1* | 9/2009 | Ciet | G06F 7/556 380/28 |
| 2014/0177824 | A1 | 6/2014 | Al-Somani | |
| 2014/0177827 | A1 | 6/2014 | Al-Somani | |

OTHER PUBLICATIONS

Leinweber, Lawrence et al. Efficient Architectures for Elliptic Curve Cryptography Processors for RFID. 2009 IEEE International Conference on Computer Design. https://ieeexplore.ieee.org/stamp/stamp.jsp?tp=&arnumber=5413128 (Year: 2009).*

Wei, Wei et al. A Modular Design of Elliptic-Curve Point Multiplication for Resource Constrained Devices. 2014 International Symposium on Integrated Circuits (ISIC). https://ieeexplore.ieee.org/stamp/stamp.jsp?tp=&arnumber=7029487 (Year: 2014).*

Leboeuf, Karl et al. A GPU implementation of the Montgomery multiplication algorithm for elliptic curve cryptography. 2013 IEEE International Symposium on Circuits and Systems (ISCAS). https://ieeexplore.ieee.org/stamp/stamp.jsp?tp=&arnumber=6572409 (Year: 2013).*

Varchola, Michal et al. MicroECC: A Lightweight Reconfigurable Elliptic Curve Crypto-Processor. 2011 International Conference on Reconfigurable Computing and FPGAs. https://ieeexplore.ieee.org/stamp/stamp.jsp?tp=&arnumber=6128578 (Year: 2011).*

Nara, Ryuta et al. Scan-Based Attack against Elliptic Curve Cryptosystems. 2010 15th Asia and South Pacific Design Automation Conference (ASP-DAC). https://ieeexplore.ieee.org/stamp/stamp.jsp?tp=&arnumber=5419848 (Year: 2010).*

Rivain, Matthieu, "Fast and Regular Algorithms for Scalar Multiplication over Elliptic Curves", International Association for Cryptologic Research, Crypto Experts, 2011, 26 pages.

Preliminary Research Report received for French Application No. 1659677, dated Jun. 20, 2017, 3 pages (1 page of French Translation Cover Sheet and 2 page of original document).

Moeller, Bodo, "Securing Elliptic Curve Point Multiplication Against Side-Channel Attacks", International Conference on Information Security, ISC 2001, 2001, pp. 324-334.

Karthikeyan, E., "Survey of Elliptic Curve Scalar Multiplication Algorithms", International Journal of Advanced Networking and Applications, vol. 4, No. 2, 2012, pp. 1581-1590, Available at <http://www.ijana.in/papers/V4I2-8.pdf>.

European Search Report received for EP Patent Application No. 17195112.2, dated Feb. 19, 2018, 2 pages of Original Document Only.

* cited by examiner

CRYPTOGRAPHIC PROCESSING METHOD COMPRISING MULTIPLICATION OF A POINT OF AN ELLIPTIC CURVE BY A SCALAR

FIELD OF THE INVENTION

The present invention relates to a cryptographic processing method comprising multiplication of a point of an elliptic curve on a Galois field by a scalar.

PRIOR ART

Many cryptographic processing performed in electronic chips comprise multiplications of elliptic curve points on a Galois field by a scalar.

Such multiplications are advantageously implemented by means of algorithms using two base functions: a doubling function of an elliptic curve point, and an addition function of two elliptic curve points. Such algorithms are called "double-and-add".

Conventional implementation of a multiplication algorithm of an elliptic curve point by a scalar of "double-and-add" type is illustrated by the pseudo-code in Appendix 1, at the end of the present description. This implementation is in the form of a R2L_DoubleAndAdd function taking as its parameter the point P and the scalar k and returning the result of the multiplication of k by P. This function uses two memory registers R0 and R1 and employs the doubling function (identified by the line of code of the form x=2*x) and the addition function (identified hereinabove by the symbol +). This implementation uses a loop, each iteration of the loop processing one of the bits of the scalar k.

One example is the scalar k=7. The non-signed binary representation of k is $(111)_2$.

The algorithm hereinabove solicits the addition and doubling functions as follows to calculate the point 7P:

$$0+(k\&1)P+((k>>1)\&1)2P+((k>>2)\&1)4P=0+P+2P+4P$$

There is now a second scalar k=485 to be considered, having for non-signed binary representation $(111100101)_2$.

Let "A" be a call to the addition function and "B" a call to the doubling function.

To calculate the point kP, the algorithm hereinabove uses the sequence of the following calls:

*DADDADDDADADADA*

During execution of the R2L_DoubleAndAdd function by a cryptographic device such as a smart card, the power consumption of the device is evident. Without particular security measures of the implementation of this function, it may be easy to distinguish a call D to the doubling function from a call A to the addition function. By closely observing the order in which these calls A and B appear in the sequence of calls performed by the function, a third party could find the value of the scalar k.

Yet, for many cryptographic processing such as ECC encryption, such a scalar must remain secret; reading its value during execution of such processing by an electronic device must therefore be forbidden.

To attain this aim, other algorithms of "double-and-add" type, comprising security measures, have been proposed, one of them for example being described in document WO 2014/111647 and comprising the following steps:

storing in a first register of a zero point of a Galois field, executing a loop comprising at least one iteration, one iteration of the loop comprising steps of:

selecting a window of w bits in the non-signed binary representation of the scalar k, calculating by means of a doubling function and storing in w second registers multiple points of P, each multiple point being associated with a bit of the window and being of the form $2^iP$ where i is a integer, adding or not in the first register multiple points stored in the second register by means of an addition function, each multiple point being added or not in the first register or not as a function of the value of the bit of the window with which the multiple point is associated, wherein the loop ends once each bit of the non-signed binary representation of the scalar k has been selected in an iteration, after the end of the loop, returning a value stored in the first register.

Each iteration of the loop processes a window of w bits of the non-signed binary representation of the scalar k. The w second registers serve to store temporarily multiple points of the form $2^iP$ (i.e., 2P, 4P, 8P, 16P, . . . ). Added to the contents of the first register are the multiple points corresponding to bits of the binary representation of the window which are equal to 1.

The sequence of calls generated for processing the scalar of non-signed binary representation $(111100101)_2$ is the following, for w=3:

*DDD AA DDD A DDD AAA*

The observation of this sequence of calls definitely determines how many there are of '1' in each window, but masks their placement in the sequence. To find the complete scalar k, exhaustive search with this unique information has to be undertaken. The number NBP of possibilities to be tested by the third-party observer is expressed as the product of the binomial coefficients x among n of the number of '1' per window, on the size of the window w, for all the windows of the scalar k. For the scalar k=485, this gives $$NBP=C_3^2 \cdot C_3^1 \cdot C_3^3$$

The algorithm presented in document WO 2014/111647 definitively ensures that the scalar k cannot be found in a single reading, without as such affecting the execution time (i.e. the number of calls D and A).

However, this algorithm is not properly protected: in fact, when a window comprises only bits equal to 1 or bits equal to zero, there is no uncertainty as to the position of the bits having '1' on the window in question. Consequently, the effort needed to find the scalar k by observation of signals is reduced.

For example, such a case occurs when this algorithm processes the scalar k=485: during the third iteration the window '111' is selected. This reduces the value NBP since the third term $C_3^3$ is worth only 1.

The prior art also discloses the method known as the Moreno-Hasan method. This method, initially presented in the document "SPA-Resistant Binary Exponentiation with optimal Execution Time", by C. Moreno and M. Anwar Hasan and published in 2011, has been reiterated in documents US2014177827, US2014177824.

The Moreno-Hasan method proposes accumulating the intermediate results of doublings in a temporary buffer. The scalar is completely encoded in advance in a non-adjacent form (NAF). The algorithm calculates at which frequency the additions must be made so that they indicate no information on the position of the bits of the encoded scalar. The observation therefore shows a regular pattern repeated several times.

A major disadvantage of this Moreno-Hasan method is that the size of the temporary buffer is not known a priori, but simply bounded. For implementation embedded in a cryptographic device with limited memory, these conditions are difficult to manage. An example given by the article by Moreno and Hasan is that for scalars having 256 bits, a buffer of size 64 points 'would be enough'. Now, many cryptographic devices (typically smart cards) cannot deal with as much memory space.

DISCLOSURE OF THE INVENTION

An aim of the invention is consequently to propose a cryptographic processing method comprising multiplication of an elliptic curve point by a scalar which is more effectively protected against attacks by observations of signals, without as such compromising either performance or memory consumption of the device which executes the method.

According to a first aspect of the invention, a cryptographic processing method is therefore proposed which is executed by at least one processor, the method comprising multiplication of a point P of an elliptic curve on a Galois field by a scalar k, the multiplication comprising steps of:
  storing in a first register a zero point of the Galois field,
  executing a loop comprising at least one iteration, one iteration of the loop comprising steps of:
    selecting a window of w bits in the non-signed binary representation of the scalar k, w being a predetermined integer independent of the scalar k and strictly greater than 1,
    calculating by means of a doubling function and storing in at most w second registers multiple points of P, each multiple point being associated with a bit of the window and being of the form $\pm 2^i P$ where i is a integer,
    adding or not in the first register multiple points stored in the second register by means of an addition function, each multiple point being added or not in the first register or not as a function of the value of the bit of the window with which the multiple point is associated,
  wherein the loop ends once each bit of the non-signed binary representation of the scalar k has been selected in an iteration,
  after the end of the loop, returning a value stored in the first register, wherein:
  if all the bits of the window selected during an iteration of the loop are zero, the iteration comprises at least one dummy execution of the addition function, and/or
  if all the bits of the window selected during an iteration of the loop are non-zero, the multiple points to be added in the first register during said iteration are determined from a non-adjacent form associated with the window.

The incorporation of at least one dummy execution of the addition function performed in the event where a window comprises only zero bits increases the number NBP of possibilities to be tested to find the scalar k by observation of signals.

As will be detailed further below, using the non-adjacent form in the case of a window comprising only non-zero bits also produces the same effect.

Also, with the size w of the window being predetermined, the consumption memory of the method is limited.

The method may also comprise the optional following features taken singly or in combination whenever technically possible.

For each iteration of the loop there may be n+m≥1, where n is the number of any dummy executions of the addition function during the iteration, and m is the number of any executions of the addition function during the addition step of the iteration.

The value n+m may be identical for several iterations of the loop, or even for all the iterations of the loop.

The windows may be selected according to a reading order of the binary representation of the scalar k going from right to left.

If several bits of the window selected during an iteration of the loop are non-zero, then the additions of multiples in the first register may be performed during the iteration in random order.

If all the bits of the window selected during an iteration of the loop are non-zero, a multiple point of negative value associated with the least significant bit of said non-adjacent form may be added in the first register during the iteration.

If all the bits of the window selected during an iteration of the loop are non-zero, a multiple point associated with the most significant bit of said non-adjacent form may be added in the first register in a later iteration or after the end of the loop.

If all the bits of the window selected during the q-th iteration of the loop are non-zero, a multiple point of value $2^{qw}P$ may be added in the first register during the q-th iteration.

According to a second aspect of the invention, a computer program product is further proposed comprising program code instructions for executing the steps of the method according to the first aspect of the invention, when this method is executed by at least one processor.

According to a third aspect of the invention, a cryptographic processing device is further proposed, comprising
  at least one processor configured to multiply a point P of an elliptic curve on a Galois field by a scalar k,
  at least one memory comprising a first register and w second registers,
wherein the multiplication comprising steps of:
  storing in the first register a zero point of the Galois field,
  executing a loop comprising at least one iteration, one iteration of the loop comprising steps of:
    selecting a window of w bits in the non-signed binary representation of the scalar k, w being a predetermined integer independent of the scalar k and strictly greater than 1,
    calculating, by means of a doubling function, and storing, in at most w of the second registers, multiple points of P, each multiple point being associated with a bit of the window and being of the form $\pm 2^i P$ where i is a integer,
    adding or not in the first register multiple points stored in the second register by means of an addition function, each multiple point being added or not in the first register or not as a function of the value of the bit of the window with which the multiple point is associated,
  wherein the loop ends once each bit of the non-signed binary representation of the scalar k has been selected in an iteration,
  after the end of the loop, returning a value stored in the first register, wherein the processor is further configured such that:

if all the bits of the window selected during an iteration of the loop are zero, the iteration comprises at least one dummy execution of the addition function, and/or if all the bits of the window selected during an iteration of the loop are non-zero, the multiple points to be added in the first register during the step are determined according to a non-adjacent form associated with the window.

According to a fourth aspect of the invention, a smart card is proposed, comprising a cryptographic processing device according to the third aspect of the invention.

DESCRIPTION OF THE FIGURES

Other features, aims and advantages of the invention will emerge from the following description which is purely illustrative and non-limiting and which must be considered in conjunction with the appended drawings in which.

In all figures, similar elements bear identical reference numerals.

DETAILED DESCRIPTION OF THE INVENTION

Figure 1:
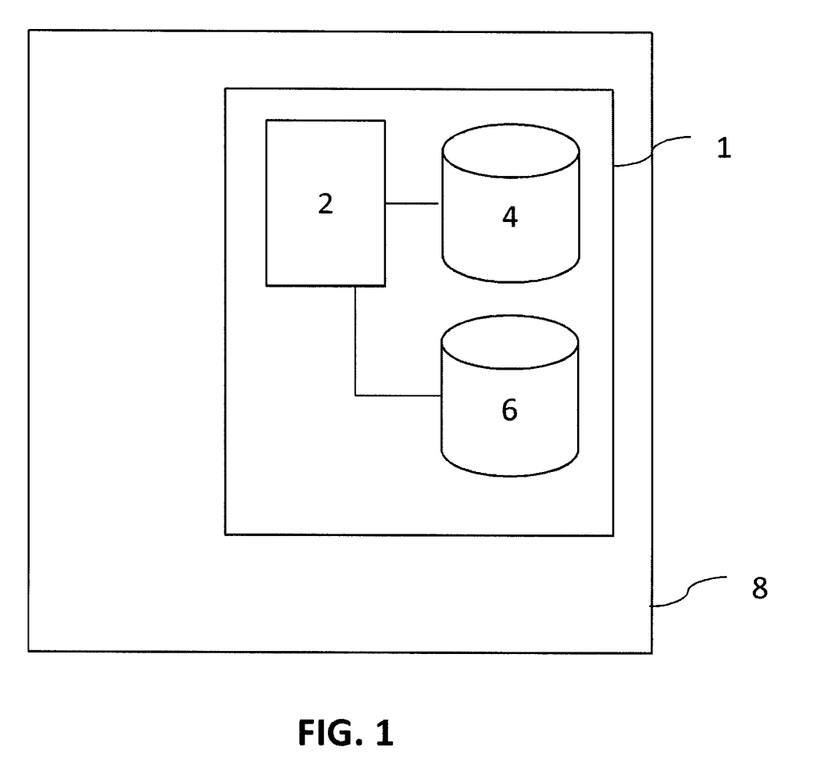
FIG. 1 schematically illustrates a cryptographic device.

In reference to FIG. 1, a cryptographic device 1 comprises at least one processor 2 and at least one memory 4, 6.

The processor 2 is configured to execute a cryptographic program.

The cryptographic program comprises program code instructions for executing the steps of a cryptographic processing method comprising at least a multiplication of a point P of an elliptic curve on a Galois field predetermined by a scalar k.

The cryptographic program is for example an ECC encryption program (acronym for "elliptic curve cryptography").

The program code instructions for executing said multiplication are for example in the form of a dedicated function.

The memory comprises a volatile memory 4 and a non-volatile memory 6. The volatile memory is for example of RAM type.

The non-volatile memory 6 is for example of type HDD, SSD, Flash, EEPROM, etc.

The volatile memory 4 comprises a plurality of registers which can be used by the processor 2 for storing temporary data during execution of the program.

The non-volatile memory 6 persistently stores the cryptographic program.

The non-volatile memory 6 also stores two base functions: a doubling function of a point P of elliptic curve (i.e., a function calculating the point 2P from point P), and an addition function of elliptic curve points. These two functions are known to those skilled in the art.

In particular, the addition function is signed, in the sense where this function is capable of handling the opposite –P of a point P of an elliptic curve, a point which is very easy to calculate (for example as opposed to calculation of an inverse of point of elliptic curve in terms of calculation of modular exponentiation).

The addition function and the doubling function may be integrated statically in the cryptographic program or else form part of a dynamic library used by the cryptographic program during its execution by the processor 2.

The cryptographic device 1 may be integrated into a smart card 8, or may itself be a smart card.

General Reminders of Various Binary Representations of a Scalar

There is not one but several possible binary representations of a scalar k. Hereinbelow, different binary representations of the same scalar are said to be "associated".

The non-signed binary representation of a scalar is widely used: this representation uses only the symbols 0 and 1.

However, there are other binary representations of a scalar k, which are signed, i.e. use the symbols 0, 1 and –1.

As is known per se, the non-adjacent form (NAF) of k is a particular and unique signed binary representation of a scalar.

In particular, it should be noted that the NAF of a scalar k whereof the non-signed binary representation is constituted by w bits equal to 1 comprises the following signed w+1 bits:

a least significant bit equal to –1, zero intermediate significant w–1 bits, a most significant bit equal to 1.

For example, the non-signed binary representation of the number k=7 is $(111)_2$, or more simply '111'. The NAF form of this number is $(1\ 0\ 0\ -1)_2 = 8-1 = 7$.

An Embodiment of a Multiplication Method of the Point P by a Scalar k

Figure 2:
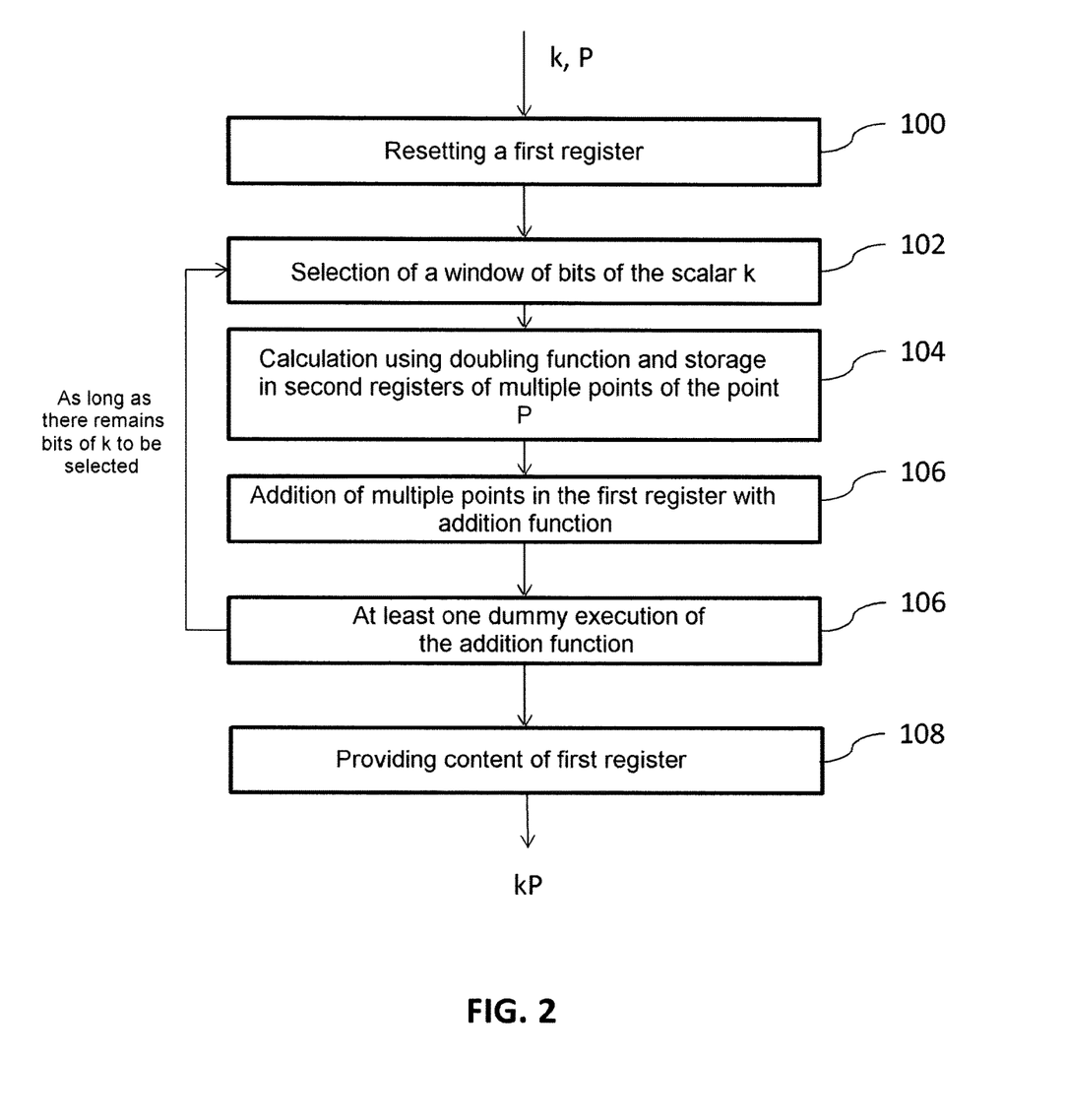
FIG. 2 is an organigram of steps of a cryptographic processing method according to an embodiment of the invention.

A multiplication method of a point P by a scalar k executed by the processor 2 is described hereinbelow in relation to FIG. 2.

The processor 2 stores 100 in a first register a zero point of the Galois field.

The processor 2 executes a loop including one or more iterations.

In a first iteration of the loop, the processor 2 selects 102 a window of the w first bits in the non-signed binary representation of the scalar k (i.e., the least significant bits in the non-signed binary representation of k). The integer w is predetermined, independent of the scalar k and strictly greater than 1.

The processor 2 calculates 104, by means of the doubling function, at most w multiple points. Each multiple point is associated with a bit of the selected window and is of the form $\pm 2^i P$ where i is a integer.

The multiple points calculated in the first iteration form part of all the following points:

$$2^0 P, 2^1 P, \ldots, 2^{w-1} P$$

All or some of these w multiple points are stored in at most w second registers different to the first register.

In a step 106, the processor 2 adds or not in the first register multiple points stored in the w second registers by means of an addition function. Each multiple point is added or not in the first register or not depending of the value of the bit of the window with which the multiple point is associated.

If at least one of the bits of the window is equal to zero and if at least one other of the bits of the window is equal to one, the multiple points which are added in the first register are those associated with non-zero bits of the window.

In the particular case where all the bits of the window are zero, no multiple point is therefore added in the first register.

If the preceding logic were applied to the case where all the bits of the window are non-zero, the w multiple points of all the above would be added in the first register.

However, such processing is not performed. It will be evident hereinbelow that different processing is executed during the proposed method.

Even though this is possible and even preferable for purposes of protection against information leaks, it is not absolutely necessary to store all the multiple points of the set of multiple points ($2^0P$, $2^1P$, . . . , $2^{w-1}P$) in the same iteration. It may be possible for example that only the multiple points to be added in the first register form the object of storage in a second register. For example, if a single one of the bits of the window is non-zero, a single multiple point of the form $\pm 2^i P$ will be added in the first register; it is therefore possible to use only one of the w registers for storing this multiple point.

The additions of multiple points in the first register, when there are several of them, are executed in random order. This complicates determination of the scalar k by observation of the calls to the addition and doubling function. For example, a permutation function defining a random order of addition of the multiple pertinent points may be called.

The first iteration of the loop is terminated.

As long as there remains at least one bit of the non-signed binary representation of the scalar k which has not been selected in a window, the above steps are executed in a further iteration.

In the last iteration, the number of bits yet to be processed may be less than w; in this case the window is completed at left by zeros.

In the step 102 executed during an iteration not being the first iteration of the loop, the w bits are selected, in the non-signed binary representation of the scalar k, immediately to the left of the window selected in the preceding iteration. In other words, the windows are selected in the loop according to order of reading of the non-signed binary representation of the scalar k going from right to left.

The multiple points calculated in the q-th iteration form part of the set of following points:

$$2^{(q-1)w+1}P, \ldots, 2^{(q-1)w+w-1}P, 2^{(q-1)w+w}P$$

The loop ends after each bit of the scalar k has been selected in a window.

On completion of the loop, the processor 2 returns the value stored in the first register. This value is the result of the multiplication of the point P by the scalar k.

Additional Protection in the Case of Specific Windows

The processor 2 carries out further processing during the loop in two particular cases:
when all the bits of a window selected are all zero, and
when all the bits of a window selected are all non-zero.

As has been developed in the introduction, these two cases are likely to reduce the effort needed to find the scalar k by observation of signals on the cryptographic device; the effect of these further processing, detailed hereinbelow, is to protect the cryptographic device from such a reduction in effort.

Case Where All the Bits of a Window Are Zero

If all the bits of the window selected during a current iteration of the loop are zero, the processor 2 executes during this current iteration, and artificially, the addition function at least once.

It is considered that execution of the addition function is dummy if the result of this execution is not used later to obtain the result of multiplication of the point P by the scalar k.

For example, the result of dummy execution is stored in a third register acting as "waste bin". The contents of this "waste bin" register are then not used. Alternatively, the processor 2 adds the "zero" value to the contents of the first register by way of dummy execution.

It is also possible to execute at least one dummy operation even if this is not the specific case of a window whereof all the bits are zero.

Let n be the number of dummy operations of the addition function executed during the current iteration, and m the number of "useful" operations executed during the addition step 106 of the current iteration.

The value m depends on the bits of the window selected during the current iteration. For example, there is m=0 in the case of a window whereof the bits are all zero.

Advantageously, the value of n is selected such that, for each iteration:

$$n+m \geq 1$$

This improves protection of the method from attacks known as "differential attacks".

Also, it may be possible to limit the number of dummy executions per iteration as follows:

$$n+m \leq w$$

The additional processor time consumption caused by the dummy operations during the loop remains moderated. Also, with such a restriction, execution of the method is likely to generate a trace of execution corresponding to processing of w bits all non-zero, which may contribute to "hide" the windows of w bits of the scalar k in which the bits are really all non-zero.

It may in particular be selected that:

$$n+m<w$$

Advantageously, the number of dummy executions n of the addition function is selected such that the total number of executions n+m of the addition function is identical for several iterations of the loop, or even identical to all the iterations of loop (in which case n+m is quite simply constant). This further complicates determination of k by observation of signals.

By fixing the total number of additions per iteration at w for example, the sequence of calls A, D likely to be observed is the following:

$$DDD\ AAA\ DDD\ AAA\ DDD\ AAA\ \ldots$$

The probability of observing proper addition is therefore 1/w. It should be noted that resistance to simple observations (non-differential) also rises with this number.

Also, for scalars k which have sizes of 224, 256, 384 and 521 bits respectively and for the case "window all at 0", all the choices of windows from 1 to 5 give a NBP>$2^{100}$.

In fact, still supposing that the total number of additions per iteration is fixed at w, there is:

$$NBP = (C_w^1)^{\frac{L}{w}}$$

This number NBP of possibilities to be tested to find the scalar k by observation of signals is so huge that all said possibilities cannot be tested exhaustively.

Case Where All the Bits of the Window Are Non-Zero

If all the bits of the window selected during a current iteration are non-zero, the multiple points added in the first register during step 106 are determined from the non-adjacent form (NAF) associated with the window (and not from the window itself, which is a portion of the non-signed binary representation of the scalar k).

As pointed out earlier, the non-adjacent form associated with a window constituted by w bits equal to '1' comprises the following signed w+1 bits: a least significant bit equal to −1, zero intermediate significant w−1 bits, then a most significant bit equal to 1.

Stored in second registers then added in the first register are the following multiple points, the current iteration being the q-th iteration:
- a first multiple point of value $-2^{(q-1)w}P$, which is associated with the least significant bit equal to '−1' of the NAF associated with the window. This multiple point is typically calculated by calculation of the opposite of the point $2^{(q-1)w}P$ (calculation of the opposite of an elliptic curve point is very easy: it is enough to take the opposite of one of the coordinates of the point $2^{(q-1)w}P$ to obtain the point $-2^{(q-1)w}P$).
- a second multiple point of value $2^{qw}P$, which is associated with the most significant bit equal to '1' of the NAF associated with the window.

These two multiple points are added in the first register during the loop.

The addition of these two multiple points determined from the NAF form (in place of multiple points determined according to the window selected in the non-signed binary representation of the scalar k) increases the number NBP of possibilities to be tested to find the scalar k by observation of signals.

It may be possible for example to store in a second register then add the first multiple point $-2^{(q-1)w}P$ during the q-th iteration.

Storage and addition of the second multiple point may be deferred to the following iteration (the (q+1)-th) to simplify the implementation of the loop and to avoid having to allocate an additional (w+1)-th second register (the NAF of the window has a length in bits equal to w+1).

In the case where the current iteration q proves to be the final iteration of the loop, this multiple point is added in the first register after the output of the loop.

Example of Implementation in Python

One possible implementation of the method of multiplication of P by k in the form of a function coded in Python for w=3 in Python is disclosed in Appendix 2, at the end of the present description. In this example implementation,
- R is a table with two entries. The first register is the first entry R[0] of this table, and the "waste bin" register is the second entry R[1] of this table.
- The entries of the table buf form the w second registers.
- The function permute.perm serves to randomly determine the order in which the additions in the first register will be done by the processor 2.
- The variable carry is a kept positioned at 1 during a current iteration in the case where all the bits of the window selected during the current iteration are non-zero. During the following iteration, it is noted that this variable carry has been positioned at 1. If the window selected during this following iteration comprises at least one zero bit, the processor 2 adds, during the following iteration, the multiple point associated with the most significant bit of the NAF of the window selected during the current iteration is to be added in the first register during this following iteration. If the window selected during this following iteration includes only non-zero bits, the addition of this multiple point is deferred to later.
- During each iteration of the loop, the number of multiple points to be added in the first register during the iteration is counted in the variable index.
- the content of the entry register containing P is crushed during the loop by application of the doubling function.

To process the scalar k having as non-signed binary representation 1000101111, four iterations are executed by the function R2L_DoubleAndDelayedAdd_w3.

The table hereinbelow details the operation of this function during these four iterations, especially the content of the different variables used.

| q | Window | Carry | carry updated | Binary representation used to determine the multiple points to be added | index | buf | Evolution of the content of the entry register |
|---|---|---|---|---|---|---|---|
| 1 | 111 | 0 | 1 | $(0\ 0\ -1)_2$ | 1 | [−P, 0, 0] | P −> 2P, 4P, 8P |
| 2 | 101 | 1 | 0 | $(110)_2 = 101 + 1$ | 2 | [16P, 32P, 0] | 8P −> 16P, 32P, 64P |
| 3 | 000 | 0 | 0 | none, one dummy addition | 1 | [64P, 0, 0] | 64P −> 128P, 256P, 512P |
| 4 | 001 | 1 | 0 | 1 | 1 | [512P, 0, 0] | 512P −> 1024P, 2048P, 4096P |

Comparative Results with Other Known Methods

The synthesis table hereinbelow compares the proposed method to two other known methods:
- the Tunstall method, described in document "Random Order Memory Exponentiation", by M. Tunstall and published in 2009, and
- the Moreno-Hasan method mentioned in the introduction.

In the table hereinbelow, n is the length in bits of the scalar k (in its non-signed binary representation), and w is the size of the selected window.

| | Tunstall | Moreno-Hasan | The proposed method |
|---|---|---|---|
| Memory | w | <n/2 | w |
| Resistance to SPA attacks | Partial | Yes | Yes |
| Resistance to DPA attacks | high | Linked to w | Adjustable |
| Number of memory copies | 0 | N | 0 |
| Extreme cases not processable? | No | Yes | No |
| Performance surplus costs relative to a classic "double-and-add" algorithm | 0 | 0 | Worst case: n/w additions On average: 0 |
| Other drawbacks | Security assured only with use of unified formulas | Excessive memory requirement for smart card implementation | |

APPENDIX 1 conventional implementation of a multiplication algorithm of an elliptic
curve point by a scalar of "double-and-add" type

```
R2L__DoubleAndAdd(k, P):
    t = k
    R0 = 0
    R1 = P
    while (t>0):
        if (t&1):
            R0 = R0 + R1
        R1 = 2*R1
        t >>= 1      // get to the next bit of the scalar k
    return R0
```

APPENDIX 2 implementation in Python of a multiplication algorithm
of an elliptic curve point by a scalar of "double-and-
add" type, according to an embodiment of the invention

```
def R2L__DoubleAndDelayedAdd_w3(k,P):
    R = [0,0]        # R[0] contains the 'true' result, R[1] serves as
waste bin register for dummy executions
    buf = [0,0,0]    # buffer for accumulation of points
    carry = 0
    while k:
        d = k & 0x7
        d += carry
        if ((d & 0x7) == 0x7): # all at one
            carry = 1
            bits = [-1,0,0]
            dst = [0]
        elif ((d & 0x7) ==0): # all at zero
            carry = d>>3
            bits = [1,0,0]
            dst = [1] # register of destination is the waste bin
register
        else:
            carry = 0
            bits = [ d & 1, (d>>1) & 1, (d>>2) & 1 ]
            dst = [0,0,0]
        index = 0
        for i in [0,1,2]:
            if bits[i]:
                buf[index] = bits[i]*P      # -P or +P
                index += 1
            else:
                R[1] = 1*P
                index += 0
        P = 2*P
        k >>= 3
        table = permute.perm(index)     # choose a permutation
on the number of non-zero elements
        for i in table:
            R[dst[i]] = R[0]+buf[i]
    if carry:
        R[0] += P
    return R[0]
```

The invention claimed is:

1. A cryptographic processing method executed by at least one processor, the method comprising multiplication of a point P of an elliptic curve on a Galois field by a scalar k, multiplication comprising:
    storing a zero point of the Galois field in a first register,
    executing a loop comprising at least one iteration, wherein one iteration of the loop comprises:
        selecting a window of w bits in a non-signed binary representation of the scalar k, wherein w is a predetermined integer independent of the scalar k and is strictly greater than 1,
        calculating, by means of a doubling function, and storing, in at most w second registers, multiple points of P, wherein each multiple point is associated with a bit of the window and is of form $\pm 2^i P$ where i is a integer,
        adding or not, in the first register, multiple points stored in the second register by means of an addition function, wherein each multiple point is added or not in the first register depending of the value of the bit of the window with which the multiple point is associated,
    wherein the loop ends once each bit of the non-signed binary representation of the scalar k has been selected in an iteration,
    after the end of the loop, returning a value stored in the first register, and wherein:
    if all the bits of the window selected during an iteration of the loop are zero, the iteration comprises at least one dummy execution of the addition function, and/or if all the bits of the window selected during an iteration of the loop are non-zero, the multiple points to be added in the first register during the step are determined from a non-adjacent form associated with the window.

2. The method according to claim 1, wherein for each iteration of the loop, there is n+m≥1, where n is the number of any dummy executions of the addition function during the iteration, and m is the number of any executions of the addition function during the addition step of the iteration.

3. The method according to claim 2, wherein n+m is identical for several iterations of the loop, or even for all the iterations of the loop.

4. The method according to claim 1, wherein the windows are selected according to order of reading of the binary representation of the scalar k going from right to left.

5. The method according to claim 1, wherein, if several bits of the window selected during an iteration of the loop are non-zero, then multiples are added in the first register during the iteration in random order.

6. The method according to claim 1 wherein, if all the bits of the window selected during an iteration of the loop are non-zero, a multiple point of negative value associated with a least significant bit of said non-adjacent form is added in the first register during the iteration.

7. The method according to claim 1, wherein, if all the bits of the window selected during an iteration of the loop are non-zero, a multiple point associated with a most significant bit of said non-adjacent form is added in the first register in a later iteration or after the end of the loop.

8. The method according to claim 1, wherein, if all the bits of the window selected during the q-th iteration of the loop are non-zero, a multiple point of value $2^{qw}P$ is added in the first register during the q-th iteration.

9. A non-transitory computer-readable medium comprising code instructions for causing at least one processor to perform the method in claim 1.

10. A cryptographic processing device comprising
    at least one processor configured to multiply a point P of an elliptic curve on a Galois field by a scalar k,
    at least one memory comprising a first register and w second registers,
wherein the multiplication comprises steps of:
    storing a zero point of the Galois field in the first register,
    executing a loop comprising at least one iteration, wherein one iteration of the loop comprises steps of:
        selecting a window of w bits in a non-signed binary representation of the scalar k, wherein w is a predetermined integer independent of the scalar k and strictly greater than 1, calculation, by means of a doubling function, and storage, in at most w of the second registers, of multiple points of P, each multiple point being associated with a bit of the window and being of the form $\pm 2^i P$ where is a integer, addition or not in the first register of multiple points stored in the second register by means of an addition function, each multiple point being added or not in the first register or not as a function of the value of the bit of the window with which the multiple point is associated, wherein the loop ends once each bit of the non-signed binary representation of the scalar k has been selected in an iteration, after the end of the loop, returning a value stored in the first register, wherein the processors is configured such that:

if all the bits of the window selected during an iteration of the loop are zero, the iteration comprises at least one dummy execution of the addition function, and/or if all the bits of the window selected during an iteration of the loop are non-zero, the multiple points to be added in the first register during the step are determined from a non-adjacent form associated with the window.

11. A smart card comprising a cryptographic processing device according to claim 10.

* * * * *